US011859299B2

(12) United States Patent
McWaid et al.

(10) Patent No.: US 11,859,299 B2
(45) Date of Patent: Jan. 2, 2024

(54) TEMPERATURE CONTROL OF AN ELECTROLYZER CELL

(71) Applicant: Verdagy, Inc., Moss Landing, CA (US)

(72) Inventors: Thomas H. McWaid, Santa Cruz, CA (US); Gal Mariansky, Morgan Hill, CA (US); Shizhao Su, Marina, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

(21) Appl. No.: 18/163,030

(22) Filed: Feb. 1, 2023

(65) Prior Publication Data

US 2023/0243048 A1 Aug. 3, 2023

Related U.S. Application Data

(63) Continuation-in-part of application No. 17/938,319, filed on Oct. 5, 2022.

(60) Provisional application No. 63/305,470, filed on Feb. 1, 2022.

(51) Int. Cl.
*C25B 9/67* (2021.01)
*C25B 1/02* (2006.01)
(Continued)

(52) U.S. Cl.
CPC .............. *C25B 9/67* (2021.01); *C25B 1/02* (2013.01); *C25B 9/19* (2021.01); *C25B 9/70* (2021.01); *C25B 15/021* (2021.01); *C25B 15/08* (2013.01)

(58) Field of Classification Search
CPC .......... C25B 1/02–1/044; C25B 15/00–15/087
See application file for complete search history.

(56) References Cited

U.S. PATENT DOCUMENTS

| 2005/0186458 A1* | 8/2005 | Rusta-Sallehy | ........... C25B 9/17 |
| | | | 429/418 |
| 2015/0218714 A1* | 8/2015 | Dees | ....................... C25B 15/08 |
| | | | 204/278 |

(Continued)

FOREIGN PATENT DOCUMENTS

| CN | 113325712 | 8/2021 |
| WO | WO-2015184388 A1 | 12/2015 |

OTHER PUBLICATIONS

"U.S. Appl. No. 17/938,319, Restriction Requirement dated Feb. 22, 2023".

(Continued)

*Primary Examiner* — Alexander W Keeling
(74) *Attorney, Agent, or Firm* — Schwegman Lundberg & Woessner, P.A.

(57) ABSTRACT

An electrolyzer system comprises a stack of one or more electrolyzer cells, each electrolyzer cell comprising first and second half cells respectively comprising first and second electrodes and a separator between the first half cell and the second half cell, wherein a current is applied between the first and second electrodes. The system further comprises first and second electrolyte feed streams for respectively feeding a first electrolyte solution at a first inlet temperature to the first half cells and a second electrolyte solution at a second inlet temperature to the second half cells, first and second electrolyte outlet streams for respectively withdrawing the first and second electrolyte solutions from the first half cells and second half cells, and a temperature control apparatus to control the first inlet temperature at a first specified temperature and to control the second inlet temperature at a second specified temperature.

26 Claims, 3 Drawing Sheets

(51) Int. Cl.
    *C25B 9/19*     (2021.01)
    *C25B 15/08*     (2006.01)
    *C25B 15/021*     (2021.01)
    *C25B 9/70*     (2021.01)

(56) References Cited

U.S. PATENT DOCUMENTS

| | | |
|---|---|---|
| 2016/0040308 A1 | 2/2016 | Stucki et al. |
| 2017/0167037 A1* | 6/2017 | Rheaume ............... C25B 9/70 |
| 2019/0009209 A1* | 1/2019 | Ukai ..................... C25B 1/04 |
| 2020/0220185 A1 | 7/2020 | Ma et al. |
| 2021/0101109 A1 | 4/2021 | Rheaume |
| 2022/0118406 A1 | 4/2022 | Lackner |
| 2023/0060683 A1* | 3/2023 | Yu ....................... C25B 15/087 |

OTHER PUBLICATIONS

"U.S. Appl. No. 17/938,319, Response filed Mar. 14, 2023 to Restriction Requirement dated Feb. 22, 2023", 8 pgs.
"U.S. Appl. No. 17/938,319, Non Final Office Action dated Mar. 22, 2023".
"NREL ("Technology Brief: Analysis of Current-Day Commercial Electrolyzers", 2004)", 2 pgs.
"International Application Serial No. PCT/US2023/061755, International Search Report dated Jul. 17, 2023", 3 pgs.
"International Application Serial No. PCT/US2023/061755, Written Opinion dated Jul. 17, 2023", 6 pgs.

* cited by examiner

TEMPERATURE CONTROL OF AN ELECTROLYZER CELL

CROSS-REFERENCE TO RELATED APPLICATION

This application claims priority under 35 U.S.C. § 119(e) to U.S. Provisional Application Ser. No. 63/305,470, filed on Feb. 1, 2022, entitled "TEMPERATURE CONTROL OF AN ELECTROLYZER CELL," and under 35 U.S.C. § 120 to U.S. application Ser. No. 17/938,319, filed on Oct. 5, 2022, entitled "SYSTEMS AND METHODS FOR PRODUCING HYDROGEN GAS," the disclosures of which are incorporated herein by reference in their entireties.

BACKGROUND

The production of hydrogen can play an important role because hydrogen gas is required for many chemical processes. As of 2019, roughly 70 million tons of hydrogen is produced annually worldwide for various uses, such as oil refining, in the production of ammonia (through the Haber process), in the production of methanol (though reduction of carbon monoxide), or as a fuel in transportation.

Historically, a large majority of hydrogen (~95%) has been produced from fossil fuels (e.g., by steam reforming of natural gas, partial oxidation of methane, or coal gasification). Other methods of hydrogen production include biomass gasification, low- or no-$CO_2$ emission methane pyrolysis, and electrolysis of water. Electrolysis uses electricity to split water molecules into hydrogen gas and oxygen gas. To date, electrolysis systems and methods have been generally more expensive than fossil-fuel based production methods. However, the fossil-fuel based methods can be more environmentally damaging, generally resulting in increased $CO_2$ emissions. Therefore, there is a need for cost-competitive and environmentally-friendly methods of hydrogen gas producing electrolysis systems and methods.

SUMMARY

The present disclosure describes an electrolyzer system comprising a stack of one or more electrolyzer cells, wherein each electrolyzer cell comprises a first half cell with a first electrode, a second half cell with a second electrode, and a separator between the first half cell and the second half cell, wherein a current is applied between the first electrode and the second electrode of each of the one or more electrolyzer cells. The system also comprises a first electrolyte feed stream for feeding a first electrolyte solution at a first inlet temperature to the first half cell of each of the one or more electrolyzer cells, a second electrolyte feed stream for feeding a second electrolyte solution at a second inlet temperature to the second half cell of each of the one or more electrolyzer cells, a first electrolyte outlet stream for withdrawing the first electrolyte solution from the first half cell of each of the one or more electrolyzer cells, a second electrolyte outlet stream for withdrawing the second electrolyte solution from the second half cell of each of the one or more electrolyzer cells, and a temperature control apparatus to control the first inlet temperature at a first specified temperature and to control the second inlet temperature at a second specified temperature.

The present disclosure also describes a method comprising feeding a first electrolyte solution at a first inlet temperature to a first half cell of each of one or more electrolyzer cells via a first electrolyte feed stream, wherein each first half cell of the one or more electrolyzer cells comprises a first electrode, feeding a second electrolyte solution at a second inlet temperature to a second half cell of each of the one or more electrolyzer cells via a second electrolyte feed stream, wherein each second half cell of the one or more electrolyzer cells comprises a second electrode, wherein the first electrode of each of the one or more electrolyzer cells is separated from the second electrode by a separator, applying a specified current between the first electrode and the second electrode of each of the one or more electrolyzer cells, controlling the first inlet temperature of the first electrolyte solution at a first specified temperature, and controlling the second inlet temperature of the second electrolyte solution at a second specified temperature.

BRIEF DESCRIPTION OF THE FIGURES

The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a recited range of values of "about 0.1 to about 5" should be interpreted to include not only the explicitly recited values of about 0.1 and about 5, but also all individual concentrations within the indicated range of values (e.g., 1, 1.23, 2, 2.85, 3, 3.529, and 4, to name just a few) as well as sub-ranges that fall within the recited range (e.g., about 0.1 to about 0.5, about 1.21 to about 2.36, about 3.3 to about 4.9, or about 1.2 to about 4.7, to name just a few). The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Hydrogen gas ($H_2$) can be formed electrochemically by a water-splitting reaction where water is split into oxygen gas ($O_2$) and $H_2$ gas at an anode and a cathode of an electrochemical cell, respectively. Examples of such electrochemical processes include, without limitation, proton electrolyte membrane (PEM) electrolysis and alkaline water electrolysis (AWE). In such electrochemical reactions, the operating energy necessary to drive the water-splitting electrolysis reaction is high due to additional energy costs as a result of various energy inefficiencies. For example, to reduce unwanted migration of ionic species between the electrodes, the cathode and the anode may be separated by a separator, such as a membrane, which can reduce migration of the ionic species. Although the separator can improve the overall efficiency of the cell, it can come at a cost of additional resistive losses in the cell, which in turn increases the operating voltage. Other inefficiencies in water electrolysis can include solution resistance losses, electric conduction inefficiencies, and/or electrode over-potentials, among others.

Figure 1:
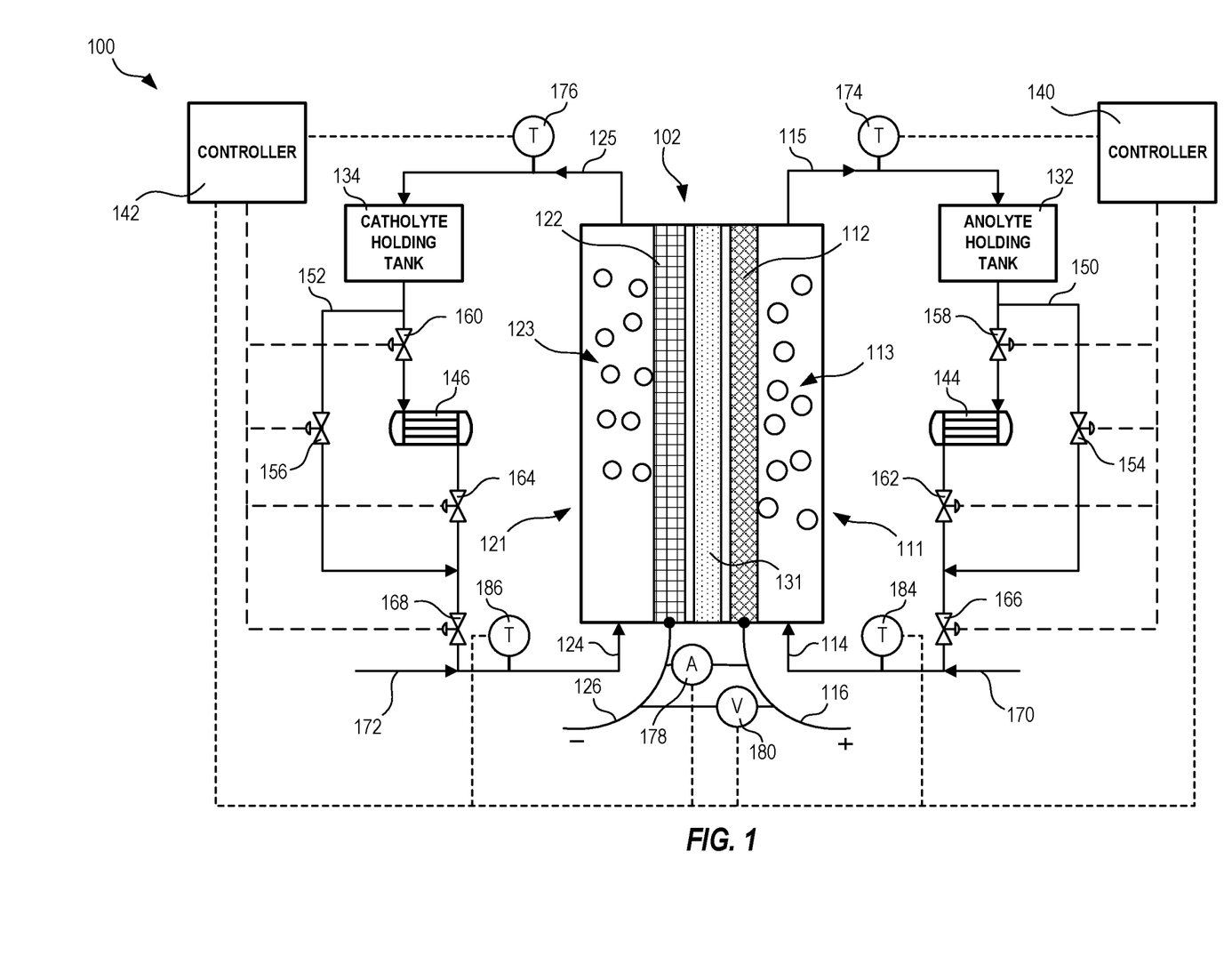
FIG. 1 is a schematic diagram of an example electrolyzer system for the electrolysis of water to produce hydrogen gas, including a temperature control apparatus to control inlet temperatures of electrolyte solution being fed to an electrolyzer cell of the system.

FIG. 1 is a schematic diagram of a system 100 that electrolytically converts water ($H_2O$) into hydrogen gas ($H_2$) and (optionally) oxygen gas ($O_2$) with electrical power. The example system 100 includes an electrolyzer cell 102. The electrolyzer cell 102 comprises two half cells: a first half cell 111 and a second half cell 121. In an example, the first and second half cells 111, 121 are separated by a separator 131, such as a membrane 131. In an example, the separator 131 comprises a porous membrane (e.g., a microporous membrane or a nanoporous membrane), an ion-exchange membrane, or an ion solvating membrane. In examples wherein the separator 131 comprises an ion-exchange membrane, the membrane can be of different types, such as an anion exchange membrane (AEM), a cation exchange membrane (CEM), a proton exchange membrane (PEM), or a bipolar ion exchange membrane (BEM).

In examples where the separator 131 is a cation exchange membrane, the cation exchange membrane can be a conventional membrane such as those available from, for example, Asahi Kasei Corp. of Tokyo, Japan, or from Membrane International Inc. of Glen Rock, NJ, USA, or from The Chemours Company of Wilmington, DE. USA. Examples of cation exchange membranes include, but are not limited to, the membrane sold under the N2030WX trade name by The Chemours Company and the membrane sold under the F8020/F8080 or F6801 trade names by the Asahi Kasei Corp. Examples of materials that can be used to form a cationic exchange membrane include, but are not limited to, a perfluorinated polymer containing anionic groups, for example sulphonic and/or carboxylic groups. It may be appreciated, however, that in some examples, depending on the need to restrict or allow migration of a specific cation or an anion species between the electrolytes, a cation exchange membrane that is more restrictive and thus allows migration of one species of cations while restricting the migration of another species of cations may be used. Similarly, in some embodiments, depending on the need to restrict or allow migration of a specific anion species between the electrolytes, an anion exchange membrane that is more restrictive and thus allows migration of one species of anions while restricting the migration of another species of anions may be used. Such restrictive cation exchange membranes and anion exchange membranes are commercially available and can be selected by one ordinarily skilled in the art.

In some examples, the separator 131 can be selected so that it can function in an acidic and/or an alkaline electrolytic solution, as appropriate. Other properties for the separator 131 that may be desirable include, but are not limited to, high ion selectivity, low ionic resistance, high burst strength, and high stability in electrolytic solution in a temperature range of room temperature to 150° C. or higher.

In an example, the separator 131 is stable in a temperature range of from about 0° C. to about 150° C., for example from about 0° C. to about 100° C., such as from about 0° C. to about 90° C., for example from about 0° C. to about 80° C., such as from about 0° C. to about 70° C., for example from about 0° C. to about 60° C., such as from about 0° C., to about 50° C., for example from about 0° C. to about 40° C., or such as from about 0° C. to about 30° C.

It may be useful to use an ion-specific ion exchange membrane that allows migration of one type of ion (e.g., cation for a CEM and anion for an AEM) but not another, or migration of one type of ion and not another, to achieve a desired product or products in the electrolyte solution.

In an example, the first half cell 111 comprises a first electrode 112, which can be placed proximate to the separator 131, and the second half cell 121 comprises a second electrode 122, which can be placed proximate to the separator 131, for example on an opposite side of the separator 131 from the first electrode 112. In an example, the first electrode 112 is the anode for the electrolyzer cell 102 and the second electrode 122 is the cathode for the electrolyzer cell 102, such that for the remainder of the present disclosure the first half cell 111 may also be referred to as the anode half cell 111, the first electrode 112 may also be referred to as the anode 112, the second half cell 121 may also be referred to as the cathode half cell 121, and the second electrode 122 may also be referred to as the cathode 122. Each of the electrodes 112, 122 can be coated with one or more electrocatalysts to speed the reaction toward the hydrogen gas ($H_2$ gas) and/or the oxygen gas ($O_2$ gas). Examples of electrocatalysts include, but are not limited to, highly dispersed metals or alloys of platinum group metals, such as platinum, palladium, ruthenium, rhodium, iridium, or their combinations such as platinum-rhodium, platinum-ruthenium, a nickel mesh coated with ruthenium oxide ($RuO_2$), or a high-surface area nickel.

The ohmic resistance of the separator 131 can affect the voltage drop across the anode 112 and the cathode 122. For example, as the ohmic resistance of the separator 131 increases, the voltage across the anode 112 and the cathode 122 may increase, and vice versa. In an example, the separator 131 has a relatively low ohmic resistance and a relatively high ionic mobility. In an example, the separator 131 has a relatively high hydration characteristics that increase with temperature, and thus decreases the ohmic resistance. By selecting a separator 131 with lower ohmic resistance known in the art, the voltage drop across the anode 112 and the cathode 122 at a specified temperature can be lowered.

In an example, the anode 112 is electrically connected to an external positive conductor 116 (also referred to as "the anode conductor 116") and the cathode 122 is electrically connected to an external negative conductor 126 (also referred to as "the cathode conductor 126"). When the separator 131 is wet and is in electrolytic contact with the electrodes 112 and 122, and an appropriate voltage is applied through the conductors 116 and 126, $O_2$ gas is liberated at the anode 112 and $H_2$ gas is liberated at the cathode 122. In certain configurations, an electrolyte, e.g., one comprising of a solution of KOH in water, is fed into the half cells 111, 121. For example, the electrolyte can flow into the anode half cell 111 through a first electrolyte inlet 114 and into the cathode half cell 121 through a second electrolyte inlet 124. In an example, the flow of the electrolyte through the anode half cell 111 picks up the produced 02 gas as bubbles 113 and exits the anode half cell 111 through a first outlet 115. Similarly, the flow of the electrolyte through the cathode half-cell 121 can pick up the produced $H_2$ gas as bubbles 123 and can exit the cathode half cell 121 through a second outlet 125. The gases can be separated from the electrolyte downstream of the electrolyzer cell 102 with one or more appropriate separators. In an example, the produced $H_2$ gas is dried and harvested into high pressure canisters or fed into further process elements. The $O_2$ gas can be allowed to simply vent into the atmosphere or can be stored for other uses. In an example, the electrolyte is recycled back into the half cells 111, 121 as needed.

As described in more detail below, at least a portion of the electrolyte that exits each half cell 111, 121 via the electrolyte outlets 115, 125 can be recirculated back to the electrolyte inlet 114, 124 (e.g., the anolyte withdrawn from the anode half cell 111 via the anolyte outlet 115 can be recirculated back to the anolyte inlet 114 and the catholyte withdrawn from the cathode half cell 121 via the catholyte outlet 125 can be recirculated back to the catholyte inlet 124). Because the outlet temperature of the electrolyte can vary over time due to variation in current density and other factors of the operation of the cell 102, in an example the outlet electrolyte for one or both of the recirculation loops can be fed into a holding tank so that the temperature of the recirculating electrolyte will be more stable and less subject to temperature variation. In the example shown in FIG. 1, a first holding tank 132 receives anolyte from the anolyte outlet 115 (also referred to as "the anolyte holding tank 132") and a second holding tank 134 receives catholyte from the catholyte outlet 125 (also referred to as "the catholyte holding tank 134").

In an example, a typical voltage across the electrolyzer cell 102 (e.g., the voltage difference between the anode conductor 116 and the cathode conductor 126) is from about 1.5 volts (V) to about 3.0 V. In an example, an operating current density for the electrolyzer cell 102 is from about 0.1 $A/cm^2$ to about 3 $A/cm^2$. Each cell 102 has a size that is sufficiently large to produce a sizeable amount of $H_2$ gas when operating at these current densities. In an example, a cross-sectional area of each cell 102 (e.g., a width multiplied by a height for a rectangular cell) is from about 0.25 square meters ($m^2$) to about 15 $m^2$, such as from about 1 $m^2$ to about 5 $m^2$, for example from about 2 $m^2$ to about 4 $m^2$, such as from about 2.25 $m^2$ to about 3 $m^2$, such as from about 2.5 $m^2$ to about 2.9 $m^2$. In an example, the total volume of each cell (e.g., a width multiplied by a height multiplied by a depth) is from about 0.1 cubic meter ($m^3$) to about 2 $m^3$, such as from about 0.15 $m^3$ to about 1.5 $m^3$, for example from about 0.2 $m^3$ to about 1 $m^3$, such as from about 0.25 $m^3$ to about 0.5 $m^3$, for example from about 0.275 $m^3$ to about 0.3 $m^3$. In an example, the total volume of the entire electrolyzer system (e.g., the combined volume of all the cells in all the stacks in the plant) is from about 1 $m^3$ to about 200 $m^3$, such as from about 2 $m^3$ to about 100 $m^3$, for example from about 2.5 $m^3$ to about 50 $m^3$.

Temperature Control

Control of the temperature within the electrolyzer cell 102 can be important for operation of the cell 102 and for overall efficiency of the system 100. In operation, the current density through the cell 102 can vary often, for instance because of power price fluctuations. To maximize performance and the lifetime of the separator 131, it is generally preferred to maintain the separator 131 within a small range of temperatures. However, even if the temperatures of the electrolyte being fed to the cell 102 at the inlets 114, 124 is held constant or substantially constant, if the current density changes significantly, then the temperature at the separator 131 will vary significantly.

The inventors have discovered that the flow rates of electrolyte through the anode half cell 111 and the cathode half cell 121 of the electrochemical cell 100 can be set so that the resulting temperature of the electrolyte outlet streams 115, 125 can be maintained within a specified range at the highest specified operational current by controlling the electrolyte temperatures at the inlet streams 114, 124.

By referring to a lookup table or some other reference, an operator can set the temperatures of the inlet streams 114, 124 as a function of the specified current at which the cell 102 is being run such that the resulting temperatures of the outlet streams 115, 125 does not fluctuate significantly, e.g., so that the temperatures of the outlet streams 115, 125 are within a specified temperature variance of a target temperature. As used herein, the term "specified current" means a planned and predetermined current at which the cell 102 is to be operated, either at the current moment in time or at some future moment in time. Therefore, in some examples, the set-point temperature for the inlet streams 114, 124 will be selected based on the current at which the cell 102 is presently being operated. In other examples, the set-point temperature for the inlet streams 114, 124 may be selected based on the current at which the cell 102 will be operated at some future time, e.g., so that the temperatures of the inlet streams 114, 124 can begin to be changed to compensate for the expected change in temperature that will result when the operating current is changed. In an example, the temperature of the inlet streams 114, 124 can be varied in order to maintain a temperature of electrolyte at the separator 131 at a constant or substantially constant set point. In an example, the temperature of the electrolyte at the separator 131 can be determined by measuring the temperatures of one or both of the outlet streams 115, 125 and calculating the temperature of the separator 131 based on one or more of the temperature of the outlet stream(s) 115, 125 and the operating current. In an example, the inlet temperature control is automated through one or more controllers 140, 142, such as a programmable logic controller ("PLC"). In an example, shown in FIG. 1, the system 100 can include a first controller 140 configured to control a temperature of the anolyte inlet 114 (also referred to as "the anolyte controller 140") and a second controller 142 configured to control a temperature of the catholyte inlet 124 (also referred to as "the catholyte controller 142"). In another example (not shown), a single controller can be used to control the temperatures of both the anolyte inlet 114 and the catholyte inlet 124 (e.g., by controlling the one or more control valves of both the anolyte recirculation loop and the catholyte recirculation loop, described below).

As described in more detail below, the temperature control can be linked to one or more of: a current setting (e.g., the current across the electrolyzer cell 102 divided by the active area of the electrodes 112, 122), the voltage across the electrolyzer cell 102, and the temperature of the corresponding outlet stream 115, 125. In some examples, the temperature control can be automated using a proportional-integral-derivative ("PID") controller, or a feed-forward control scheme, or both. In an example, the inlet temperature is controlled via a feed-forward control based on one or more of: a current setpoint, the flow rate of electrolyte through the cell 102, and the observed voltage across the electrolyzer cell 102. In another example, in addition to the feed-forward control by current, the temperature of the corresponding electrolyte outlet 115, 125 can also be used to control the temperature of the inlet 114, 124 via a PID controller tuned for slow response, which can allow the temperature of the outlet 115, 125 to fine tune the temperature of the inlet 114, 124, after a fast response from the feed-forward controller.

The combination of a fast linear temperature control of one or both of the electrolyte inlets 114, 124 with a feed-forward controller setting the inlet temperature set point based on one or more of current, electrolyte flow rate, and observed voltage across the cell 102 can provide for stable temperature control for the outlet stream 115, 125 when changing the current (e.g., when changing the current being applied across the cell 102 in order to change the $H_2$ production rate). Rapid temperature management in this way can compensate for quick changes of current while minimizing thermal shock to the separator 131, the electrodes 112, 122, and other components of the cell 102.

In an example, shown in FIG. 1, control of the temperatures of the inlet stream 114, 124 is effectively accomplished using a mixing scheme with an electrolyte cooler 144, 146 that can cool at least a portion of the hot electrolyte return as it recirculates from the electrolyte outlet 115, 125 (or from the corresponding holding tank 132, 134 if the system 100 includes outlet holding tanks 132, 134) to the corresponding electrolyte inlet 114, 115. In the example of FIG. 1, a first electrolyte cooler 144 is configured for cooling anolyte from the anolyte outlet 115 exiting the anode half cell 111 before it is recycled back to the anolyte inlet 114 (such that the first electrolyte cooler 144 will also be referred to as "the anolyte cooler 144"). A similar second electrolyte cooler 146 is configured for cooling catholyte from the catholyte outlet 125 exiting the cathode half cell 121 before it is recycled to the catholyte inlet 124 (such that the second electrolyte cooler 146 will also be referred to as "the catholyte cooler 146"). Each of the electrolyte coolers 144, 146 can comprise any kind of cooling apparatus that is feasible for cooling an electrolyte stream in one or both of the recirculation loops, including, but not limited to, a heat exchanger (such as a shell-and-tube heat exchanger or other type of heat exchanger, and using any feasible cooling medium, such as cooling water, cooling air, or a different cooled stream) or an electric cooler.

In an example, the electrolyte recycling configuration can include a bypass line 150, 152 that is configured to allow some or all of the recycling electrolyte to bypass its corresponding electrolyte cooler 144, 146. For example, a first bypass line 150 can bypass the anolyte cooler 144 (such that it will also be referred to as "the anolyte bypass line 150")

and a second bypass line 152 can bypass the catholyte cooler 146 (such that it will also be referred to as "the catholyte bypass line 152"). The bypassing portion of the electrolyte in the bypass lines 150, 152 is not cooled by their corresponding electrolyte coolers 144, 146 such that the bypassing portion remains at or near the hot temperature that it had exiting the cell 102 in the electrolyte outlets 115, 125.

One or more control valves can be included for each electrolyte recirculation line to modulate the proportion of recycling electrolyte that flows through the electrolyte cooler 144, 146 and the proportion that will flow through the bypass line 150, 152. In one example, the control valve can be on the bypass line 150, 152 itself, such as a first bypass line control valve 154 to control a flow rate through the anolyte bypass line 150 (also referred to as "the anolyte bypass control valve 154") and/or a second bypass line control valve 156 to control a flow rate of catholyte through the catholyte bypass line 152 (also referred to as "the catholyte bypass control valve 156"). With a control valve 154, 156 controlling the flow rate of electrolyte through the bypass line 150, 152, the control valves 154, 156 also act to modulate the flow rate through the corresponding electrolyte cooler 144, 146. For example, because the total recirculation flow rate of anolyte recirculating from the anolyte outlet 115 to the anolyte inlet 114 is set, if the anolyte bypass control valve 154 reduces the flow rate of anolyte through the anolyte bypass line 150, then it by necessity would increase the relative flow rate of anolyte through the anolyte cooler 144.

In another example, the control scheme can include a control valve for controlling a flow rate at the inlet into the electrolyte cooler 144, 146 in addition to or in place of the bypass control valve 154, 156. In the example shown in FIG. 1, this can comprise a first heat exchanger inlet control valve 158 to control a flow rate of anolyte into the anolyte cooler 144 (also referred to as "the anolyte inlet control valve 158") and/or a second heat exchanger inlet control valve 160 to control a flow rate of catholyte into the catholyte cooler 146 (also referred to as "the catholyte inlet control valve 160"). In another example, the control scheme can include a control valve for controlling a flow rate at the outlet coming out of the electrolyte cooler 144, 146 in addition to or in place of one or both of the bypass control valve 154, 156 or the heat exchanger inlet control valve 158, 160. In the example shown in FIG. 1, this can comprise a first heat exchanger outlet control valve 162 to control a flow rate of anolyte exiting the anolyte cooler 144 (also referred to as "the anolyte outlet control valve 162") and/or a second heat exchanger outlet control valve 164 to control a flow rate of catholyte exiting the catholyte cooler 146 (also referred to as "the catholyte outlet control valve 164").

Those having skill in the art will appreciate that any one of the control valves 154, 158, 162 on the anolyte recirculation side can be used to modulate the flow rate of anolyte through the anolyte cooler 144 and the anolyte bypass line 150 and that the control valve or valves 154, 158, 162 that are used are a matter of design choice. For example, temperature control of the recirculating anolyte could be accomplished via the use of only the anolyte bypass control valve 154, only the anolyte inlet control valve 158, only the anolyte outlet control valve 162, a combination of the anolyte bypass control valve 154 and the anolyte inlet control valve 158, or a combination of the anolyte bypass control valve 154 and the anolyte outlet control valve 162. Similarly, those having skill in the art will appreciate that any one of the control valves 156, 160, 164 on the catholyte recirculation side can be used to modulate the flow rate of catholyte through the catholyte cooler 146 and the catholyte bypass line 152 and are a matter of design choice. For example, temperature control of the recirculating catholyte could be accomplished via the use of only the catholyte bypass control valve 156, only the catholyte inlet control valve 160, only the catholyte outlet control valve 164, a combination of the catholyte bypass control valve 156 and the catholyte inlet control valve 160, or a combination of the catholyte bypass control valve 156 and the catholyte outlet control valve 164.

Depending on the ambient temperature and the volumes of electrolyte being used, in some examples, the system 100 may also include one or more electrolyte heaters on one or both recirculation sides of the system 100 to achieve the specified electrolyte inlet temperature for one or both of the anolyte inlet 114 and the catholyte inlet 115. In one example, one or both of the electrolyte coolers 144, 146 can be replaced with an electrolyte heater. In another example, an electrolyte heater can be included on one or both bypass lines 150, 152 to heat electrolyte flowing through the bypass line 150, 152 (similar to the scheme shown for the temperature control subsystem 210 in the example system 200 of FIG. 2). In yet another example, a heater can be included on one or both of the electrolyte holding tanks 132, 134 to heat the electrolyte solution in the holding tank 132, 134 before it flows to the recirculation and cooling loop.

The electrolyte flowing through the electrolyte cooler 144, 146 and the bypass line 150, 152 are then mixed to provide a cooled electrolyte that is cooler than the temperature upstream of the electrolyte cooler 144, 146, wherein the cooled electrolyte is fed back into its corresponding half cell 111, 121 via the electrolyte inlet 114, 124. The relative flow rates of electrolyte passing through the electrolyte cooler 144, 146 versus the bypass line 150, 152 is selected to achieve a specified set-point temperature for the electrolyte inlet 114, 124. For example, if it is desired that the temperature of the anolyte to be fed into the anode half cell 111 via the inlet 114 be higher than its current temperature, then the one or more control valves 154, 158, 162 on the anolyte recirculation side can be controlled so that a lower proportion of the anolyte flows through the anolyte cooler 144 relative to the proportion of the anolyte that flows through the anolyte bypass line 150. This will result in a relatively smaller amount of the anolyte being cooled by the anolyte cooler 144, and, therefore, the temperature of the anolyte after mixing the two streams will be higher. Similarly, if it is desired that the temperature of the catholyte to be fed into the cathode half cell 121 be lower than its current temperature, then the one or more control valve 156, 160, 154 on the catholyte recirculation side can be controlled so that a higher proportion of the catholyte flows through the catholyte cooler 146 relative to the proportion that flows through the catholyte bypass line 152. This arrangement would result in a relatively higher amount of the catholyte being cooled by the catholyte cooler 146, and, therefore, the temperature of the catholyte after mixing the two streams being lower.

In an example, the system 100 can also include a flow control valve 166, 168 located downstream of the mixing point where the cooled electrolyte exiting the electrolyte cooler 144, 146 mixes with the uncooled electrolyte from the bypass line 150, 152. In an example, the system 100 comprises a first flow control valve 166 to control a flow rate of anolyte that is recirculated to the anolyte inlet 114 and a second flow control valve 168 to control a flow rate of catholyte that is recirculated to the catholyte inlet 124. The system 100 can also include a makeup line for each recirculation loop to introduce additional water or electrolyte to compensate for the water that is consumed as part of the electrolysis reactions that generate $H_2$ gas at the cathode 122 and (optionally) $O_2$ gas at the anode 112, such as an anode-side makeup line 170 to introduce makeup water or makeup anolyte to the anolyte inlet 114 and a cathode-side makeup line 172 to introduce makeup water or makeup catholyte to the catholyte inlet 124.

In an example, one or both of the electrolyte coolers 144, 146 are at least slightly oversized in terms of the flow rate that the electrolyte cooler 144, 146 can accommodate or the heat exchange capacity of the electrolyte cooler 144, 146, so that the combination of the electrolyte cooler 144, 146 and the bypass line 150, 152 can provide for adequate temperature control and flow control. The inventors have found that this type of temperature control for the electrolyte inlet streams 114, 124 can provide for fast and linear or substantially linear inlet temperature control, compared to controlling the temperature of the inlet stream 114, 124 by changing the amount of cooling water being fed to the electrolyte coolers 144, 146.

The system 100 can include one or more temperature sensors to measure a temperature of the electrolyte outlet 115, 125 for one or both of the recirculation loops in the system 100. The temperature of the electrolyte outlet 115, 125 can be used as an approximation of the temperature of the separator 131 within the cell 102 at that particular point in time. In other examples, it may be assumed (based on historical experimental data) that the temperature at the separator 131 is a specified number of degrees higher than the temperature measured by the temperature sensors on the electrolyte outlets 115, 125. In still other examples, other parameters of the cell 102 can be used to estimate the temperature at the separator 131 in place of or in addition to the temperature of the electrolyte outlet 115, 125. For example, the voltage across the cell 102 (or each cell if the cell 102 is part of a larger electrolyzer stack) can be measured and the measured voltages across the cell can be used to determine an estimated temperature at the separator 131 of the cell 102 (or of each cell in the stack, if the cell 102 is part of a larger electrolyzer stack). In an example, a first outlet temperature sensor 174 is positioned on the anolyte outlet 115 to measure an outlet temperature of the anolyte exiting the anode half cell 111 (also referred to as "the anolyte outlet temperature sensor 174") and a second outlet temperature sensor 176 is positioned on the catholyte outlet 125 to measure an outlet temperature of the catholyte exiting the cathode half cell 121 (also referred to as "the catholyte outlet temperature sensor 176"). In operation, one or both of the controllers 140, 142 can be configured to receive an outlet temperature signal corresponding to one or both of the electrolyte outlets 115, 125 from one or both of the electrolyte outlet temperature sensors 174, 176. In an example where the system 100 includes a separate anolyte controller 140 and catholyte controller 142, the anolyte controller 140 can be configured to receive a first outlet temperature signal from the anolyte outlet temperature sensor 174 and the catholyte controller 142 can be configured to receive a second outlet temperature signal from the catholyte outlet temperature sensor 176.

The one or more controllers 140, 142 use the temperature signal received from the outlet temperature sensor 174, 176 to control the one or more control valves 154, 156, 158, 160, 162, 164 that are included in the system 100 to control the electrolyte flow rates through the electrolyte cooler 144, 146 and the bypass line 150, 152 in order to achieve a desired temperature set point for the corresponding electrolyte inlet 114, 124. For example, the anolyte controller 140 can receive a temperature signal from the anolyte outlet temperature sensor 174 corresponding to the temperature of the anolyte outlet 115. The anolyte controller 140 uses the anolyte outlet temperature signal to control the one or more control valves 154, 158, 162, which controls the flow rate of recirculating anolyte through the anolyte cooler 144 and the anolyte bypass line 150 in a proportion that will achieve a specified temperature set point for the anolyte inlet 114. The anolyte controller 140 can also be configured to control the flow control valve 166 to control the overall flow rate of anolyte that is recirculated to the anolyte inlet 114, which may also be varied to achieve the specified anolyte inlet temperature set point.

Similarly, the catholyte controller 142 can receive a temperature signal from the catholyte outlet temperature sensor 176 corresponding to the temperature of the catholyte outlet 125. The catholyte controller 142 uses the catholyte outlet temperature signal to control the one or more control valves 156, 160, 164 to control the flow rate of recirculating catholyte through the catholyte cooler 146 and the catholyte bypass line 152 in a proportion that will achieve a specified temperature set point for the catholyte inlet 124. The catholyte controller 142 can also be configured to control the flow control valve 168 to control the overall flow rate of catholyte that is recirculated to the catholyte inlet 124, which may also be varied to achieve the specified catholyte inlet temperature set point.

As noted above, the specified temperature set point for one or both of the electrolyte inlets 114, 124 can be set based on the current that is presently being applied across the electrolyzer cell 102 or on the current that is planned to be applied across the electrolyzer cell 102 at a future time. As will be appreciated by those having skill in the art, it is known that the temperature at a separator within an electrolyzer cell can depend on the current that is being applied across the cell because a lower current density tends to result in less heating due to resistive losses and a lower temperature at the separator, and a higher current density tends to result in more heat due to resistive losses and a higher temperature at the separator. Therefore, in an example, the system 100 can include an ammeter 178 that is configured to measure a current through the electrolyzer cell 102. In one example, shown in FIG. 1, the ammeter 178 can measures the current passing through one or both of the anode conductor 116 and the cathode conductor 126. In another example, the current passing through the cell 102 can be determined by measuring or otherwise determining the current being provided by a power supply. For example, if current is supplied to the cell 102 from a rectifier that rectifies alternating current from an AC source to direct current that is supplied to the cell 102, the current supplied by the rectifier can be used by the one or more controllers 140, 142 as the current for the cell 102, which can be used in conjunction with the temperature at the separator 131 (e.g., determined in relation to the outlet temperatures measured by one or both outlet temperature sensors 174, 176. In other examples, the temperature control scheme can be configured to control the electrolyte temperature for a stack of a plurality of electrolyzer cells. In such an example, the ammeter or other apparatus for determining current through a cell can be configured to determine or provide the current through one of the cells in the stack, a plurality of the cells in the stack, or the current through the entire stack.

In another example, the system 100 can include a voltmeter 180 to measure a voltage across the cell 102, e.g., to measure a potential difference between the anode conductor 116 and the cathode conductor 126. The voltmeter 180 can be included in place of or in addition to the ammeter 178. One or both of the controllers 140, 142 can receive a voltage signal from the voltmeter 180. In an example, the current can be determined by one or more of the controllers 140, 142 by dividing the measured voltage by the resistance through the electrolyzer cell 102, which may be known from earlier experimentation. In some examples, the voltmeter 180 can be used by the one or more controllers in conjunction with the current through the cell 102 to determine the power dissipated within the cell 102, which can be related to the temperature of the separator 131.

The current that is determined by one or both of the controllers 140, 142 can be used to control one or both of the recirculation loops in order to achieve the specified anolyte inlet temperature or the specified catholyte inlet temperature, or both. For example, one or both controllers 140, 142 can use a lookup table of the expected temperature at the separator 131 at a particular anolyte inlet temperature and/or catholyte inlet temperature and when the electrolyzer cell 102 is operating at a particular current. One or both controllers 140, 142 can then use the lookup table, the determined current, and a specified target temperature for the separator 131 to determine the desired specified inlet temperature or temperatures for the anolyte inlet 114 and the catholyte inlet 124. Then, one or both controllers 140, 142 can control the one or more control valves 154, 156, 158, 160, 162, 164 on each recirculation loop so that the relative proportion of electrolyte flowing throw each electrolyte cooler 144, 146 relative to the electrolyte flowing through its corresponding bypass line 150, 152 will achieve the specified electrolyte inlet temperature that was determined based on the current and the specified target temperature for the separator 131.

Although it is believed that the specified target electrolyte inlet temperature for one or both of the electrolyte inlets 114, 124 can be controlled by measuring only the temperature of one or both of the electrolyte outlets 115, 125, in an example, the system 100 can also include one or more temperature sensors to measure a temperature of the electrolyte inlet 114, 124 for one or both of the recirculation loops in the system 100. In an example, a first inlet temperature sensor 184 is positioned on the anolyte inlet 114 to measure an inlet temperature of the anolyte entering the anode half cell 111 (also referred to as "the anolyte inlet temperature sensor 184") and a second inlet temperature sensor 186 is positioned on the catholyte inlet 124 to measure an inlet temperature of the catholyte entering the cathode half cell 121 (also referred to as "the catholyte inlet temperature sensor 186"). In operation, one or both of the controllers 140, 142 can be configured to receive an inlet temperature signal corresponding to one or both of the electrolyte inlets 114, 124 from one or both of the electrolyte inlet temperature sensors 184, 186. In an example where the system 100 includes a separate anolyte controller 140 and catholyte controller 142, the anolyte controller 140 can be configured to receive a first inlet temperature signal from the anolyte inlet temperature sensor 184 and the catholyte controller 142 can be configured to receive a second inlet temperature signal from the catholyte inlet temperature sensor 186. One or both of the controllers 140, 142 can use the inlet temperature signals from the inlet temperature sensors 184, 186 to check the effectiveness of the particular proportion of electrolyte flowing through the electrolyte cooler 144, 146 and the bypass line 150, 152 for one or both of the recirculation loops, which one or both controllers 140, 142 can use to modify the flow rates of electrolyte through the electrolyte cooler 144, 146 and its corresponding bypass line 150, 152 if needed to achieve the desired specified electrolyte inlet temperature.

In an example, the specified electrolyte inlet temperature can be determined based on the expected temperature change for the electrolyte as it passes through the cell 102, e.g., based on the expected temperature rise for the anolyte as it passes through the anode half cell 111 and the expected temperature rise for the catholyte as it passes through the cathode half cell 121. In the case of the anolyte, the expected temperature change, $\Delta T_A$, is defined by Equation [1]:

$$\Delta T_A = T_{A,Out} - T_{A,In} = \frac{Q_A}{\dot{m}_A \times C_{pA}} \quad [1]$$

where $T_{A,In}$ is the inlet temperature of the anolyte, e.g., at the anolyte inlet 114, $T_{A,Out}$ is the outlet temperature of the anolyte, e.g., at the anolyte outlet 115, $\dot{m}_A$ is the mass flow rate of the anolyte through the anode half cell 111, $C_{pA}$ is the specific heat capacity of the anolyte, and $Q_A$ is the power dissipated as heat on the anode side of the cell 102. The power dissipated as heat, $Q_A$, is defined by Equation [2]:

$$Q_A = I \times V_{LA} \quad [2]$$

where I is the current through the cell 102 and $V_{LA}$ is the lossy voltage on the anode side of the cell 102. Equations [1] and [2] can be combined and solved for the inlet temperature, $T_{A,In}$, which results in Equation [3]:

$$T_{A,In} = T_{A,Out} - \Delta T_A = T_{A,Out} - \frac{I \times V_{LA}}{\dot{m}_A \times C_{pA}} \quad [3]$$

The lossy voltage for the entire cell, $V_L$, is the sum of the lossy voltage on the anode side of the cell 102, $V_{LA}$, and the lossy voltage on the cathode side of the cell 102, $V_{LC}$, as shown in Equation [4]:

$$V_L = V_{LA} + V_{LC} = V_{Cell} - V_{TN} \quad [4]$$

where $V_{Cell}$ is the total voltage across the cell 102 and $V_{TN}$ is the thermal neutral voltage for the electrolysis reactions in the cell 102 (e.g., about 1.48 V). In some examples, data from experimentation on the cell 102 or from other sources may indicated that during typical operation of the cell, the lossy voltage on the anode side $V_{LA}$ makes up a certain percentage of the overall lossy voltage for the entire cell $V_L$. For example, for a particular configuration of the cell, the anode lossy voltage $V_{LA}$ may typically be about 80% of the overall lossy voltage $V_L$ (e.g., $V_{LA} = 0.8\ V_L$), in which case the cathode lossy voltage $V_{LC}$ would be about 20% of the overall lossy voltage $V_L$ (e.g., $V_{LC} = 0.2\ V_L$).

In practice, one or both of the controllers 140, 142 can use the desired temperature of the separator 131 as the set value of $T_{A,Out}$, can use the current signal value received from the ammeter 178 (or from another source of the current through the cell) and/or can calculate the current using the voltage signal value received from the voltmeter 180 as the value of I, and can determine the anode-side lossy voltage $V_{LA}$ (which can be determined based on experimentation on the anode side of the cell in conjunction with the voltage across the cell 102, e.g., as measured by the voltmeter 180, as $V_{Cell}$ and the overall lossy voltage $V_L$ calculated by Equation [4]) to calculate the specified anolyte inlet temperature as the resulting $T_{A,In}$ from Equation [3]. As discussed above, one or both of the controllers 140, 142 can then determine the flow rates of anolyte through the anolyte cooler 144 and the anolyte bypass line 150 that can achieve that specified anolyte inlet temperature, $T_{A,In}$, and can control the one or more control valves 154, 158, 162 accordingly.

The same analysis can be applied to the cathode side of the cell 102 to determine a specified catholyte inlet temperature. Specifically, calculating the change in temperature for the catholyte, $\Delta T_C$, based on the power dissipated as heat on the cathode side can be calculated according to Equation [5]:

$$\Delta T_C = T_{C,Out} - T_{C,In} = \frac{Q_C}{\dot{m}_C \times C_{pC}} \qquad [5]$$

where $T_{C,In}$ is the inlet temperature of the catholyte at the catholyte inlet 124, $T_{C,Out}$ is the outlet temperature of the catholyte at the catholyte outlet 125, $\dot{m}_C$ is the mass flow rate of the catholyte through the cathode half cell 121, $C_{pC}$ is the specific heat capacity of the catholyte, and $Q_C$ is the power dissipated as heat on the cathode side of the cell 102. The power dissipated as heat on the cathode side, $Q_C$, is defined by Equation [6]:

$$Q_C = I \times V_{LC} \qquad [6]$$

where I is the current through the cell 102 and $V_{LC}$ is the lossy voltage on the cathode side of the cell 102. Equations [5] and [6] can be combined and solved for the inlet temperature, $T_{C,In}$, which results in Equation [7]:

$$T_{C,In} = T_{C,Out} - \Delta T_C = T_{C,Out} - \frac{I \times V_{LC}}{\dot{m}_C \times C_{pC}} \qquad [7]$$

As described above with respect to Equation [4], the lossy voltage on the cathode side, $V_{LC}$, is combined with the lossy voltage on the anode side, $V_{LA}$, to result in the overall lossy voltage, $V_L$. Similar to the process described above, one or both of the controllers 140, 142 can use the desired temperature of the separator 131 as the set value of $T_{C,Out}$, the measured current as the value of I, and can determine the cathode-side lossy voltage $V_{LC}$ (e.g., based on the experimentation on the cathode side of the cell in conjunction with the voltage across the cell 102, e.g., as measured by the voltmeter 180, as $V_{Cell}$ and the overall lossy voltage $V_L$ calculated by Equation [4]) to calculate the specified catholyte inlet temperature as the resulting $T_{C,In}$ from Equation [7]. One or both of the controllers 140, 142 can then determine the flow rates of catholyte through the catholyte cooler 146 and the catholyte bypass line 152 that can achieve that specified catholyte inlet temperature, $T_{C,In}$, and can control the one or more control valves 156, 160, 164 accordingly.

Figure 2:
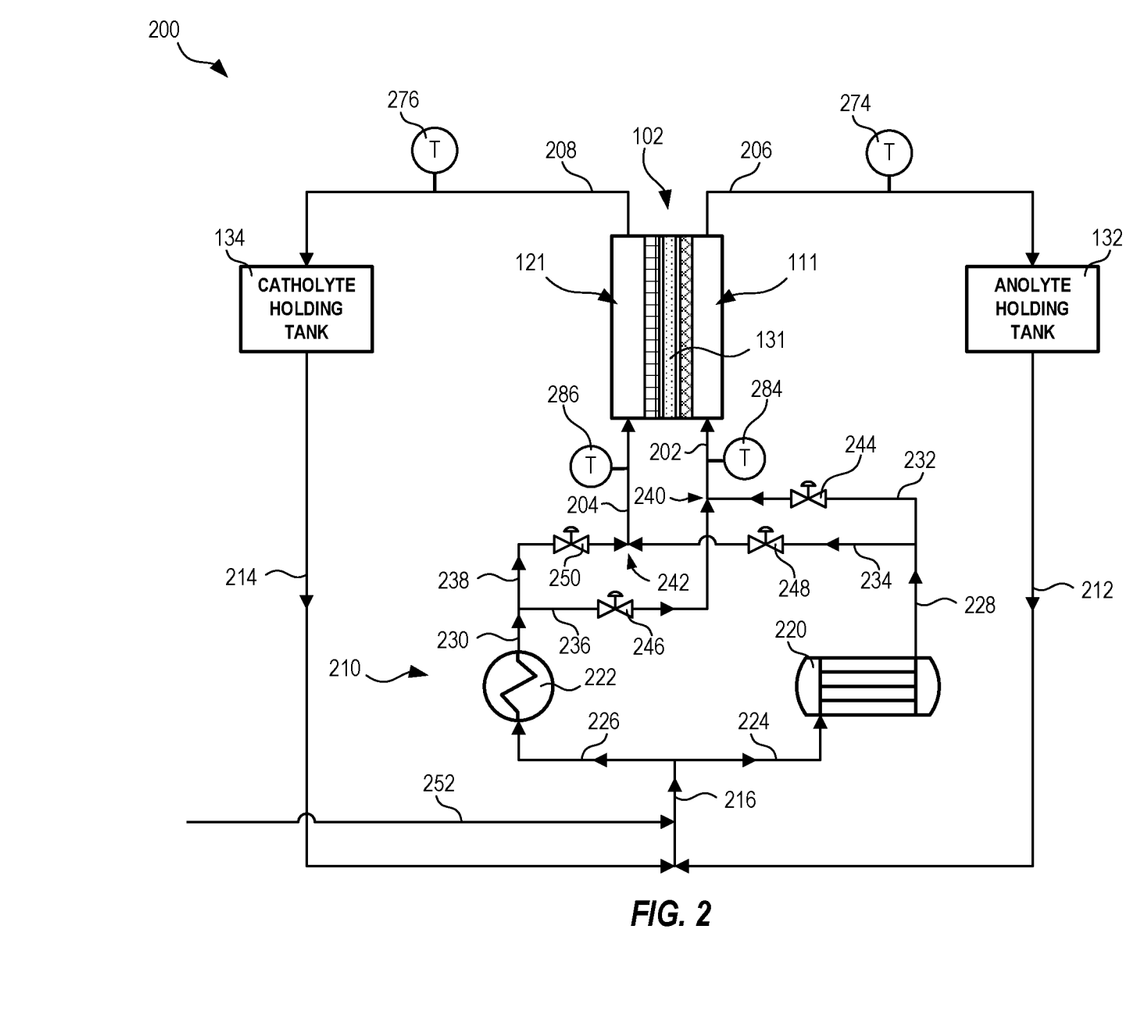
FIG. 2 is a schematic diagram of another example electrolyzer system for the electrolysis of water to produce hydrogen with an alternative temperature control apparatus to control inlet temperatures of electrolyte solution being fed to an electrolyzer cell of the system.

In the example shown in FIG. 1, the anolyte recirculation loop (e.g., the anolyte outlet 115, the optional anolyte holding tank 132, the anolyte cooler 144, the anolyte bypass line 150, and the anolyte inlet 114) is separate from the catholyte recirculation loop (e.g., the catholyte outlet 125, the catholyte holding tank 134, the catholyte cooler 146, the catholyte bypass line 152, and the catholyte inlet 124). For example, the anolyte and the catholyte may comprise different compositions (e.g., different chemical compounds or different concentrations of the same chemical compound or compounds). However, in some examples, the same electrolyte solution is used for both the anolyte that passes through the anode half cell and the catholyte that passes through the cathode half cell. For example, in many electrolyzer systems, potassium hydroxide (KOH) is used as both the anolyte and catholyte in the electrolyzer cell. In such an example, the overall system may include a common temperature control apparatus and at least a portion of the recirculation loop can be commonly used by both the anolyte and the catholyte. FIG. 2 shows an example system 200 with a common temperature control scheme. Portions of the system 200 that are the same as in the system 100 of FIG. 1 are given the same reference numbers.

As can be seen in FIG. 2, the system 200 includes an electrolyzer cell 102. Many of the specific details of the cell 102 are not shown in FIG. 2, but those having skill in the art will appreciate that the electrolyzer cell 102 in the system 200 can be similar or identical to the electrolyzer cell 102 described above for the system 100, e.g., with an anode half cell 111 and a cathode half cell 121 separated by a separator 131. The anode half cell 111 can include an anode on one side of the separator 131 and the cathode half cell 121 can include a cathode on the opposing side of the separator 131. Conductors can be electrically connected to the anode and the cathode so that a voltage can be applied across the cell in order to evolve $H_2$ gas from the cathode.

Electrolyte solution is fed to both the anode half cell 111 and the cathode half cell 121, such as anolyte into the anode half cell 111 via an anolyte inlet 202 and catholyte into the cathode half cell 121 via a catholyte inlet 204. Electrolyte is also withdrawn from the half cells 111, 121, e.g., anolyte can be withdrawn from the anode half cell 111 via an anolyte outlet 206 and catholyte can be withdrawn from the cathode half cell 121 via a catholyte outlet 208. The system 200 can also include one or more holding tanks for the electrolyte, such as an anolyte holding tank 132 that can receive and hold anolyte from the anolyte outlet 206 and a catholyte holding tank 134 that can receive and hold catholyte from the catholyte outlet 208.

Instead of having separate temperature control subsystems for both the anolyte and the catholyte, as in the system 100, the system 200 includes a common temperature control subsystem 210 that can act to control the temperature for both the anolyte that will be fed into the anode half cell 111 via the anolyte inlet 202 and the catholyte that will be fed into the cathode half cell 121 via the catholyte inlet 204. For example, an anolyte withdrawal line 212 can withdraw anolyte from the anolyte holding tank 132 and a catholyte withdrawal line 214 can withdraw catholyte from the catholyte holding tank 134. The two withdrawal lines 212 and 214 can be combined so that the recirculating anolyte and the recirculating catholyte mix together in a common recirculation line 216 that is fed into the temperature control subsystem 210. The temperature control subsystem 210 is configured to control the temperature of the recirculating electrolyte to achieve a specified electrolyte inlet temperature for both the anolyte inlet 202 and the catholyte inlet 204.

In an example, the temperature control subsystem 210 includes an electrolyte cooler 220 and an optional electrolyte heater 222. The common recirculation line 216 is split into a cooling recirculation branch 224 that is fed into the electrolyte cooler 220 and a heating recirculation branch 226 that is fed into the electrolyte heater 222. The electrolyte cooler 220 is configured to cool the electrolyte in the cooling recirculation branch 224 to a lower temperature, which provides a cooled stream 228, while the electrolyte heater 222 is configured to heat the electrolyte in the heating recirculation branch 226 to a higher temperature, which provides a heated stream 230.

The electrolyte cooler 220 can be similar to the electrolyte coolers 144, 146 in the system 100. For example, the electrolyte cooler 220 can be a shell and tube heat exchanger, an electric cooler, or any other equipment that can cool the electrolyte solution to a lower temperature. The electrolyte heater 222 can be an electric heater or other equipment that can raise the temperature of a portion of the recirculating electrolyte. In some examples, the electrolyte heater 222 may be deactivated so that it does not heat the portion of electrolyte that is flowing through the heating recirculation branch 226, in which case the heating recirculation branch 226 acts essentially the same as the bypass lines 150, 152 in the system 100 of FIG. 1.

The cooled stream 228 and the heated stream 230 can be recombined so that the resulting temperature of the mixed cooled and heated portions will be at or proximate to the desired specified electrolyte inlet temperature. Specifically, the cooled stream 228 can be split into a cooled anolyte stream 232 and a cooled catholyte stream 234 and the heated stream 230 can be split into a heated anolyte stream 236 and a heated catholyte stream 238. The cooled anolyte stream 232 and the heated anolyte stream 236 can be combined, for example at an anolyte mixing point 240, to form the anolyte inlet 202. Similarly, the cooled catholyte stream 234 and the heated catholyte stream 238 can be combined, for example at a catholyte mixing point 242, to form the catholyte inlet 204.

The temperature control subsystem 210 can also include flow valves to control the flow rate of one or more of the cooled anolyte stream 232, the cooled catholyte stream 234, the heated anolyte stream 236, and the heated catholyte stream 238. For example, the anolyte side of the recirculation scheme can include a first anolyte control valve 244 that is configured to control a flow rate of the cooled anolyte stream 232 (also referred to as "the anolyte temperature control valve 244") and a second anolyte control valve 246 that is configured to control a flow rate of the heated anolyte stream 236 (also referred to as "the anolyte flow control valve 246"). The catholyte side of the recirculation scheme can include a first catholyte control valve 248 that is configured to control a flow rate of the cooled catholyte stream 234 (also referred to as "the catholyte temperature control valve 248") and a second catholyte control valve 250 that is configured to control a flow rate of the heated catholyte stream 238 (also referred to as "the catholyte flow control valve 250").

In an example, the temperature control valves 244, 248 on the cooled streams 232, 234 are controlled to modulate the proportion of cooled electrolyte that will make up the electrolyte inlet 202, 204 in order to achieve the specified electrolyte inlet temperature, e.g., the anolyte temperature control valve 244 will control the flow rate of the cooled anolyte stream 232 so that the desired specified anolyte inlet temperature for the anolyte inlet 202 will be achieved and the catholyte temperature control valve 246 will control the flow rate of the cooled catholyte stream 236 so that the desired specified catholyte inlet temperature for the catholyte inlet 204 will be achieved. In an example, the flow control valves 246, 250 are controlled to modulate the amount of heated electrolyte that will make up the electrolyte inlet 202, 204 in order to ensure that a desired overall flow rate of electrolyte into the half cells 111, 121 is achieved, e.g., the anolyte flow control valve 246 will control the flow rate of the heated anolyte stream 236 so that the desired overall flow rate for the anolyte inlet 202 is achieved, and the catholyte flow control valve 250 will control the flow rate of the heated catholyte stream 238 so that the desired overall flow rate for the catholyte inlet 204 is achieved.

The system 200 can also include a makeup line 252 to introduce makeup water or makeup electrolyte to compensate for water that is consumed via the electrolysis reactions to generate $H_2$ gas and (optionally) $O_2$ gas. In the example shown in FIG. 2, the makeup line 252 is mixed with the common recirculation line 216 before it is split into the cooling recirculation branch 224 and the heating recirculation branch 226.

The system 200 can include one or more temperature sensors to measure temperatures of one or more of the electrolyte inlets 202, 204 and/or the electrolyte outlets 206, 208. In an example, an anolyte outlet temperature sensor 274 is positioned on the anolyte outlet 206 to measure an outlet temperature of the anolyte exiting the anode half cell 111 and a catholyte outlet temperature sensor 276 is positioned on the catholyte outlet 125 to measure an outlet temperature of the catholyte exiting the cathode half cell 121. The system 200 can also include one or more controllers (not shown, but similar to the controllers 140, 142 of the system 100 of FIG. 1), which can be configured to receive an outlet temperature signal corresponding to one or both of the electrolyte outlets 206, 208 from one or both of the electrolyte outlet temperature sensors 274, 276, which can be used to control the control valves 244, 246, 248, 250 to achieve the desired specified electrolyte inlet temperatures and/or a desired overall electrolyte flow rate into each half cell 111, 121, similar to the operation described above for the control of the control valves 154, 156, 158, 160, 162, 164 in the system 100 of FIG. 1.

In an example, the system 200 also includes one or more temperature sensors to measure a temperature of the electrolyte inlet 202, 204 for one or both of the anode side and the cathode side of the temperature control subsystem 210. For example, an anolyte inlet temperature sensor 284 can be positioned on the anolyte inlet 202 to measure an inlet temperature of the anolyte entering the anode half cell 111 and a catholyte inlet temperature sensor 286 can be positioned on the catholyte inlet 204 to measure an inlet temperature of the catholyte entering the cathode half cell 121. One or more controllers can be configured to receive an inlet temperature signal corresponding for one or both of the electrolyte inlets 202, 204 from one or both of the electrolyte inlet temperature sensors 284, 286, which can be used to control the control valves 244, 246, 248, 250 to achieve the desired specified electrolyte inlet temperatures and/or a desired overall electrolyte flow rate into each half cell 111, 121, similar to the operation described above for the control of the control valves 154, 156, 158, 160, 162, 164 in the system 100 of FIG. 1.

The systems 100 and 200 of FIGS. 1 and 2 are each shown with only a single electrolyzer cell 102. However, the example temperature control schemes could also be used for temperature control of the electrolyte inlet feeds into multi-cell electrolyzer stacks. For example, the system 100 of FIG. 1 could include substantially the same recirculation loops with the holding tanks 132, 134, the electrolyte coolers 144, 146, bypass lines 150, 152, but instead of the electrolyte outlets 115, 125 each coming out of an individual half cell 111, 121 of an individual cell 102, each electrolyte outlet line 115, 125 can receive the outlet streams from the corresponding half cells for each cell in a multi-cell stack. For example, in a system including a plurality of cells 102 each including an anode half cell 111 and a cathode half cell 121 (e.g., with each cell 102 being identical or substantially identical to the cell 102 shown in FIG. 1) the anolyte outlet 115 can be configured to receive the anolyte flowing out of all of the anode half cells 111 in the stack. Similarly, the catholyte outlet 125 can be configured to receive the catholyte flowing out of all of the cathode half cells 121 in the stack. Similarly, in a system comprising a stack of cells 102, instead of the electrolyte inlets 114, 124 each feeding an individual half cell 111, 121 of an individual cell 102, each electrolyte inlet line 114, 124 can be a common feed line that is split in order to feed the half cells for each cell in the multi-cell stack. For example, the anolyte inlet 114 can be configured as a common feed line that is split to feed all of the anode half cells 111 in the multi-cell stack and the catholyte inlet 124 can be configured as a common feed line that is split to feed all of the cathode half cells 121 in the multi-cell stack. The system 200 of FIG. 2 can be similarly configured to accommodate temperature control of multiple cells in a multi-cell stack instead of just the individual cell 102 shown in FIG. 2.

Simulations were run to estimate temperature rise and distribution of the electrolyte as it flows through the half cells 111, 121 of the electrolyzer cell 102. It was found that when the electrolyte is introduced as a cold fluid, it quickly warms (e.g., within the first few centimeters of height of the half cell 111, 121), and is then at a constant or substantially constant temperature along the height of the cell 102. It is this uniformity or substantially uniformity of the fluid temperature that can provide for the avoidance of the formation of temperature gradients across the separator 131, which in turn can enable the temperature control schemes of the present disclosure.

Demonstration studies were performed wherein the inlet stream temperatures were varied so as to maintain the specified outlet stream temperatures. The results agree well with the results of the simulations.

Figure 3:
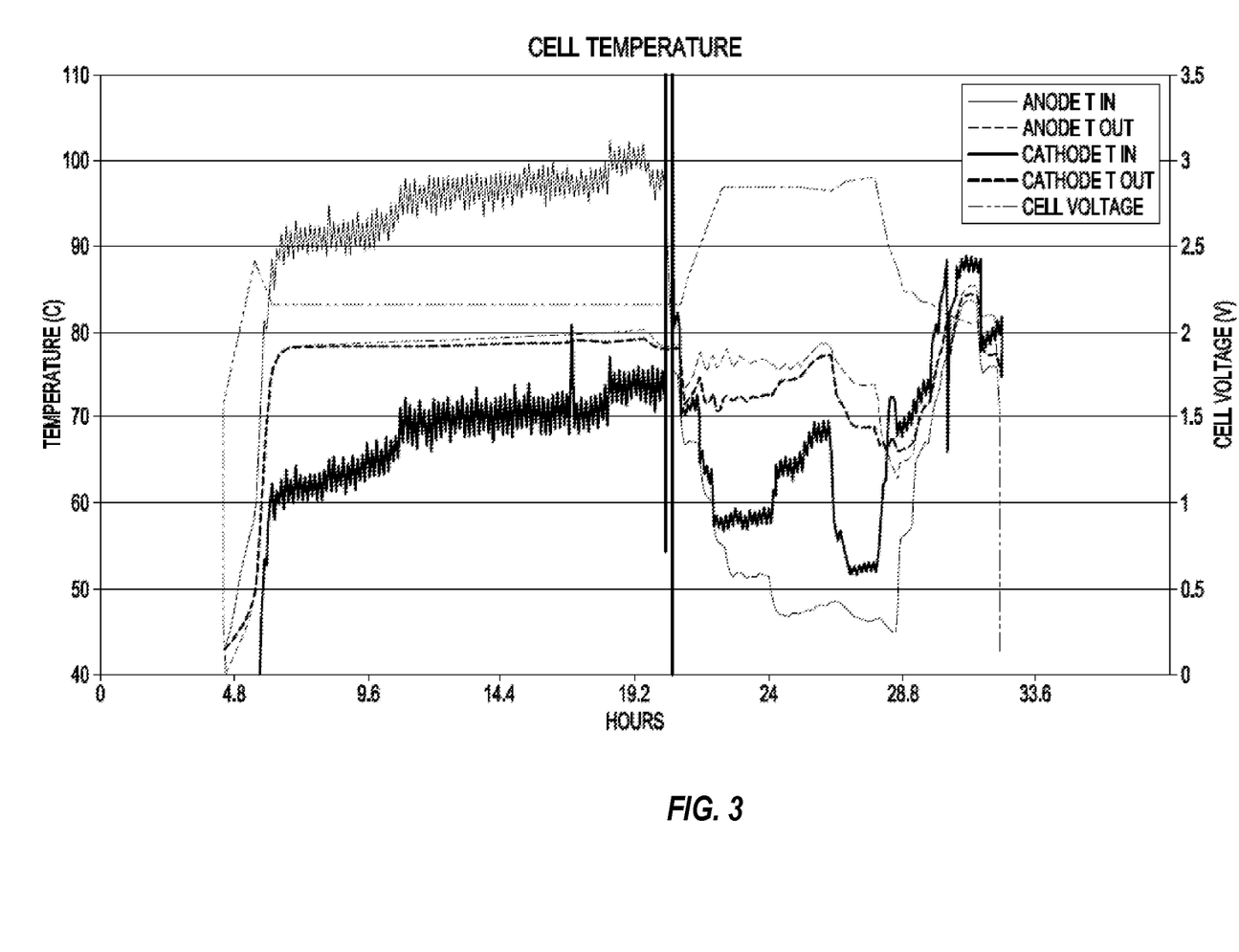
FIG. 3 is a graph of data for an experiment implementing a temperature control apparatus to control inlet temperatures of electrolyte solution into the electrolyzer cell.

FIG. 3 is a graph of data from an initial demonstration cell experiment. Although the temperature data is quite noisy, one can see that at 3 A/cm2 (corresponding to cell voltage of about 2.8 V), the anode inlet and outlet temperatures were about 48° C. and about 78° C., respectively, and the cathode inlet and outlet temperatures were about 52° C. and about 69° C., respectively. Averaging the two, the temperature rise through the cell was roughly 28° C., in-line with what simulations predicted for those conditions. The data of FIG. 3 also shows a temperature dependence for the cell voltage, with lower voltages (and corresponding higher efficiency) when operating with higher outlet temperatures. Care can be taken to ensure that the separator runs sufficiently warm but is not overheated to the point of thermal degradation.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An electrolyzer system comprising:
a stack of one or more electrolyzer cells, each electrolyzer cell comprising:
a first half cell with a first electrode;
a second half cell with a second electrode; and
a separator between the first half cell and the second half cell;

wherein a current is applied between the first electrode and the second electrode of each of the one or more electrolyzer cells;

a first electrolyte feed stream for feeding a first electrolyte solution at a first inlet temperature to the first half cell of each of the one or more electrolyzer cells;

a second electrolyte feed stream for feeding a second electrolyte solution at a second inlet temperature to the second half cell of each of the one or more electrolyzer cells;

a first electrolyte outlet stream for withdrawing the first electrolyte solution from the first half cell of each of the one or more electrolyzer cells;

a second electrolyte outlet stream for withdrawing the second electrolyte solution from the second half cell of each of the one or more electrolyzer cells; and a temperature control apparatus to adjust one or both of the first inlet temperature of at least one of the one or more electrolyzer cells and the second inlet temperature of at least one of the one or more electrolyzer cells, wherein the temperature control apparatus comprises one or more controllers configured for feed-forward control of an electrolyte temperature at the separator of at least one of the one or more electrolyzer cells by adjusting one or both of the first inlet temperature of at least one of the one or more electrolyzer cells and the second inlet temperature of at least one of the one or more electrolyzer cells based on one or both of: the current between the first electrode and the second electrode of at least one of the one or more electrolyzer cells, and a voltage measured across the first and second electrodes of at least one of the one or more electrolyzer cells.

2. The electrolyzer system of claim 1, wherein the one or more controllers are also configured for feed-forward control of the electrolyte temperature at the separator by adjusting one or both of the first inlet temperature and the second inlet temperature based on at least one of: an overall voltage measured across the stack, a flow rate of the first electrolyte solution through the first half cell of at least one of the one or more electrolyzer cells, and a flow rate of the second electrolyte solution through the second half cell of at least one of the one or more electrolyzer cells.

3. The electrolyzer system of claim 1, wherein at least a first portion of the first electrolyte solution of the first electrolyte outlet stream is recycled back to the first electrolyte feed stream and at least a first portion of the second electrolyte solution of the second electrolyte outlet stream is recycled back to the second electrolyte feed stream, wherein the temperature control apparatus comprises at least one electrolyte heat exchanger configured to heat or cool one or both of the first portion of the first electrolyte solution and the first portion of the second electrolyte solution prior to recirculation back to the first electrolyte feed stream and the second electrolyte feed stream.

4. The electrolyzer system of claim 3, wherein the temperature control apparatus further comprises at least one bypass line configured to bypass one or both of a second portion of the first electrolyte solution and a second portion of the second electrolyte solution past the at least one electrolyte heat exchanger.

5. The electrolyzer system of claim 4, wherein the electrolyte heat exchanger comprises a cooler configured to cool one or both of the first portion of the first electrolyte solution and the first portion of the second electrolyte solution, and wherein the temperature control apparatus further comprises an electrolyte heater configured to heat one or both of the second portion of the first electrolyte solution and the second portion of the second electrolyte solution.

6. The electrolyzer system of claim 4, further comprising at least one flow control valve configured to modulate a ratio of a first flow rate of one or both of the first portion of the first electrolyte solution and the first portion of the second electrolyte solution through the at least one electrolyte heat exchanger relative to a second flow rate of one or both of the second portion of the first electrolyte solution and the second portion of the second electrolyte solution through the at least one bypass line.

7. The electrolyzer system of claim 1, wherein at least a first portion of the first electrolyte solution from the first electrolyte outlet stream is recycled as at least a portion of the first electrolyte solution fed to the first half cell of each of the one or more electrolyzer cells via the first electrolyte feed stream, wherein the temperature control apparatus comprises an electrolyte heat exchanger configured to heat or cool at least the first portion of the first electrolyte solution from the first electrolyte outlet stream.

8. The electrolyzer system of claim 7, further comprising an electrolyte bypass line configured to bypass a second portion of the first electrolyte solution from the first electrolyte outlet stream past the first electrolyte heat exchanger.

9. The electrolyzer system of claim 8, further comprising a control valve configured to modulate a ratio of a first flow rate of the first portion of the first electrolyte solution through the electrolyte heat exchanger and a second flow rate of the second portion of the first electrolyte solution through the electrolyte bypass line.

10. The electrolyzer of claim 1, wherein the one or more controllers are also configured for feedback control of the electrolyte temperature at the separator of at least one of the one or more electrolyzer cells based on at least one of: a first outlet temperature of the first electrolyte solution exiting the first half cell of at least one of the one or more electrolyzer cells, and a second outlet temperature of the second electrolyte solution exiting the second half cell of at least one of the one or more electrolyzer cells.

11. The electrolyzer of claim 1, wherein the feed-forward control comprises determining an expected change in the electrolyte temperature at the separator of at least one of the one or more of the electrolyzer cells in response to a corresponding change in the current being applied between the first electrode and the second electrode of at least one of the one or more electrolyzer cells.

12. The electrolyzer of claim 11, wherein determining the expected change in the electrolyte temperature at the separator of at least one of the one or more electrolyzer cells comprises referring to a lookup table of expected temperature changes at particular electrolyte solution inlet temperatures, applied currents, and electrolyte flow rates.

13. The electrolyzer of claim 11, wherein determining the expected change in electrolyte temperature at the separator of at least one of the one or more electrolyzer cells comprises calculating the expected change in electrolyte temperature at the separator of at least one of the one or more electrolyzer cells based on power dissipated as heat in at least one of the one or more electrolyzer cells, a specific heat capacity of one or both of the first electrolyte solution flowing through the first half cell of at least one of the one or more electrolyzer cells and the second electrolyte solution flowing through the second half cell of at least one of the one or more electrolyzer cells, and a flow rate of one or both of the first electrolyte solution flowing through the first half cell of at least one of the one or more electrolyzer cells and the second electrolyte solution flowing through the second half cell of at least one of the one or more electrolyzer cells.

14. A method comprising:

feeding a first electrolyte solution at a first inlet temperature to a first half cell of each of one or more electrolyzer cells via a first electrolyte feed stream, wherein each first half cell of the one or more electrolyzer cells comprises a first electrode;

feeding a second electrolyte solution at a second inlet temperature to a second half cell of each of the one or more electrolyzer cells via a second electrolyte feed stream, wherein each second half cell comprises a second electrode, wherein the first electrode of each of the one or more electrolyzer cells is separated from the second electrode by a separator;

applying a current between the first electrode and the second electrode of each of the one or more electrolyzer cells;

controlling an electrolyte temperature at the separator of at least one of the one or more electrolyzer cells by adjusting one or both of the first inlet temperature of the first electrolyte solution of at least one of the one or more electrolyzer cells; and the second inlet temperature of the second electrolyte solution of at least one of the one or more electrolyzer cells, wherein the controlling of the electrolyte temperature at the separator of at least one of the one or more electrolyzer cells comprises feed-forward control of the electrolyte temperature at the separator of at least one of the one or more electrolyzer cells by adjusting one or both of the first inlet temperature of at least one of the one or more electrolyzer cells and the second inlet temperature of at least one of the one or more electrolyzer cells based on one or both of: the current between the first electrode and the second electrode of at least one of the one or more electrolyzer cells, and a voltage measured across the first and second electrodes of at least one of the one or more electrolyzer cells.

15. The method of claim 14, wherein the adjusting of one or both of the first inlet temperature of at least one of the one or more electrolyzer cells and the second inlet temperature of at least one of the one or more electrolyzer cells for the feed-forward control of the electrolyte temperature at the separator is also based on at least one of: an overall voltage measured across the stack, a flow rate of the first electrolyte solution through the first half cell of a least one of the one or more electrolyzer cells, and a flow rate of the second electrolyte solution through the second half cell of at least one of the one or more electrolyzer cells.

16. The method of claim 14, further comprising recycling at least a first portion of the first electrolyte solution exiting the first half cells of the one or more electrolyzer cells back to the first electrolyte feed stream and recycling at least a first portion of the second electrolyte solution exiting the second half cells of the one or more electrolyzer cells back to the second electrolyte feed stream, wherein one or both of controlling the first inlet temperature of the first electrolyte solution and controlling the second inlet temperature of the second electrolyte solution comprises heating or cooling one or both of the first portion of the first electrolyte solution and the first portion of the second electrolyte solution prior to recirculation back to the first electrolyte feed stream and the second electrolyte feed stream.

17. The method of claim 16, wherein one or both of controlling the first inlet temperature of the first electrolyte solution and controlling the second inlet temperature of the second electrolyte solution comprises bypassing the heating or cooling by one or both of a second portion of the first electrolyte solution and a second portion of the second electrolyte solution.

18. The method of claim 14, further comprising recycling at least a recycled portion of the first electrolyte solution exiting the first half cells of the one or more electrolyzer cells back to the first electrolyte feed stream and recycling at least a recycled portion of the second electrolyte solution exiting the second half cells of the one or more electrolyzer cells back to the second electrolyte feed stream, wherein one or both of controlling the first inlet temperature of the first electrolyte solution and controlling the second inlet temperature of the second electrolyte solution comprises cooling one or both of a first portion of the recycled portion of the first electrolyte solution and a first portion of the recycled portion of the second electrolyte solution and heating one or both of a second portion of the recycled portion of the first electrolyte solution and a second portion of the recycled portion of the second electrolyte solution prior to recirculation back to the first electrolyte feed stream and the second electrolyte feed stream.

19. The method of claim 18, wherein one or both of controlling the first inlet temperature of the first electrolyte solution and controlling the second inlet temperature of the second electrolyte solution comprises modulating a ratio of a first flow rate of one or both of the first portion of the first electrolyte solution and the first portion of the second electrolyte solution relative to a second flow rate of one or both of the second portion of the first electrolyte solution and the second portion of the second electrolyte solution.

20. The method of claim 14, further comprising recycling at least a first portion of the first electrolyte solution exiting the first half cells of the one or more electrolyzer cells as at least a first portion of the first electrolyte solution of the first electrolyte feed stream, wherein controlling the first inlet temperature of the first electrolyte solution comprises heating or cooling at least the first portion of the first electrolyte solution.

21. The method of claim 20, further comprising bypassing the heating or cooling by a second portion of the first electrolyte solution.

22. The method of claim 21, further comprising modulating a first ratio of a first flow rate of the first portion of the first electrolyte solution relative to a second flow rate of the second portion of the first electrolyte solution.

23. The method of claim 14, wherein the controlling of the electrolyte temperature at the separator of at least one of the one or more electrolyzer cells also comprises feedback control of the electrolyte temperature at the separator of at least one of the one or more electrolyzer cells based on at least one of: a first outlet temperature of the first electrolyte solution exiting the first half cell of at least one of the one or more electrolyzer cells, and a second outlet temperature of the second electrolyte solution exiting the second half cell of at least one of the one or more electrolyzer cells.

24. The method of claim 14, wherein the feed-forward control of the electrolyte temperature at the separator of at least one of the one or more electrolyzer cells comprises:

determining an expected change in the electrolyte temperature at the separator of at least one of the one or more of the electrolyzer cells in response to a corresponding change in the current being applied between the first electrode and the second electrode of at least one of the one or more electrolyzer cells; and controlling one or both of the first inlet temperature of at least one of the one or more electrolyzer cells and of the second inlet temperature of at least one of the one or more electrolyzer cells based on the expected change in the electrolyte temperature at the separator of at least one of the one or more electrolyzer cells.

25. The method of claim 24, wherein determining the expected change in the electrolyte temperature at the separator of at least one of the one or more electrolyzer cells comprises referring to a lookup table of expected temperature changes at particular electrolyte solution inlet temperatures, applied currents, and electrolyte flow rates.

26. The method of claim 24, wherein determining the expected change in the electrolyte temperature at the separator of at least one of the one or more electrolyzer cells comprises calculating the expected change in the electrolyte temperature at the separator of at least one of the one or more electrolyzer cells based on power dissipated as heat in at least one of the one or more electrolyzer cells, a specific heat capacity of one or both of the first electrolyte solution flowing through the first half cell of at least one of the one or more electrolyzer cells and the second electrolyte solution flowing through the second half cell of at least one of the one or more electrolyzer cells, and a flow rate of one or both of the first electrolyte solution flowing through the first half cell of at least one of the one or more electrolyzer cells and the second electrolyte solution flowing through the second half cell of at least one of the one or more electrolyzer cells.

* * * * *